(12) United States Patent
Yamamoto et al.

(10) Patent No.: US 8,455,156 B2
(45) Date of Patent: Jun. 4, 2013

(54) SEPARATOR FOR FUEL CELL AND FUEL CELL

(75) Inventors: Yoshinori Yamamoto, Toyota (JP); Hiroya Nakaji, Toyota (JP); Hitoshi Hamada, Gotenba (JP); Toshiyuki Suzuki, Toyota (JP); Haruyuki Aono, Nagoya (JP)

(73) Assignee: Toyota Jidosha Kabushiki Kaisha, Toyota-shi (JP)

(*) Notice: Subject to any disclaimer, the term of this patent is extended or adjusted under 35 U.S.C. 154(b) by 355 days.

(21) Appl. No.: 12/741,803

(22) PCT Filed: Nov. 4, 2008

(86) PCT No.: PCT/JP2008/070374
§ 371 (c)(1),
(2), (4) Date: May 6, 2010

(87) PCT Pub. No.: WO2009/060971
PCT Pub. Date: May 14, 2009

(65) Prior Publication Data
US 2010/0239957 A1      Sep. 23, 2010

(30) Foreign Application Priority Data
Nov. 8, 2007   (JP) .................................. 2007-290287

(51) Int. Cl.
*H01M 8/02*      (2006.01)
(52) U.S. Cl.
USPC ....................................................... 429/514
(58) Field of Classification Search
USPC ....................................................... 429/514
See application file for complete search history.

(56) References Cited

FOREIGN PATENT DOCUMENTS

| | | |
|---|---|---|
| JP | 2003-142126 A | 5/2003 |
| JP | 2005-108505 A | 4/2005 |
| JP | 2005-317311 A | 11/2005 |
| JP | 2007-73192 A | 3/2007 |
| JP | 2007-220686 A | 8/2007 |
| JP | 2007220686 A * | 8/2007 |
| WO | WO 2006/075786 A1 | 7/2006 |

* cited by examiner

*Primary Examiner* — Karie O'Neill Apicella
(74) *Attorney, Agent, or Firm* — Kenyon & Kenyon LLP

(57) ABSTRACT

A separator has a concavo-convex structure formed in mutually reversed shapes on two opposite sides thereof to define flow paths of different fluids on the respective two sides. The concavo-convex structure includes multiple first projections formed and protruded on one side of the two opposite sides and arranged at intervals having a preset regularity. The concavo-convex structure also includes multiple second projections formed and protruded on the other side of the two opposite sides in a specific area corresponding to an area for formation of the multiple first projections on the one side and arranged at intervals having a preset regularity. The concavo-convex structure further includes reinforcing elements protruded on the one side. Each of the reinforcing elements is formed as a convex in a specific shape of connecting multiple positions where the first projections are expected to be formed according to the preset regularity, while avoiding positions corresponding to the second projections formed on the other side. This arrangement effectively prevents a potential trouble caused by deformation of the separator due to a pressure difference between the flow pressures of the respective fluids flowing on the respective sides of the separator.

11 Claims, 9 Drawing Sheets

GAS FLOW PATH SIDE

REFRIGERANT FLOW PATH SIDE

GAS FLOW PATH SIDE

REFRIGERANT FLOW PATH SIDE

GAS FLOW PATH SIDE

REFRIGERANT FLOW PATH SIDE

SEPARATOR FOR FUEL CELL AND FUEL CELL

This is a 371 national phase application of PCT/JP2008/070374 filed 4 Nov. 2008, which claims priority of Japanese Patent Application No. 2007-290287 filed 8 Nov 2007, the contents of which are incorporated herein by reference.

TECHNICAL FIELD

The present invention relates to a fuel cell and a separator for the fuel cell.

BACKGROUND ART

One known configuration of a separator used for fuel cells has a concavo-convex structure formed in mutually reversed shapes on two opposite sides thereof and define flow paths of different fluids on the respective sides (see, for example, Japanese Patent Laid-Open No. 2003-142126). In a fuel cell assembly including such separators, the concavo-convex structures formed on opposed sides of adjacent separators are arranged to side each other. The convexes of the concavo-convex structures formed on the opposed sides of the adjacent separators mutually support the adjacent separators. This assures the sufficient rigidity of the whole fuel cell assembly. The relevant prior art techniques include those disclosed in, for example, Japanese Patent Application No. 2006-519715 (International Publication No. 06/075786) and Japanese Patent Laid-Open No. 2005-108505.

In a separator having flow paths of different fluids formed on two opposite sides thereof, the respective fluids flowing on the respective sides may have different flow pressures. Application of a non-uniform force onto the separator, for example, due to a pressure difference between the flow pressures of the respective fluids may cause deformation of the separator. The deformation of the separator may lead to the occurrence of a contact failure between the deformed separator and an adjacent member and increase the contact resistance to worsen the power collection efficiency. The separator may have a convex formed on at least one side to part the flow path formed on the side into an upstream region and a downstream region. The deformation of the separator having this structure may cause the fluid to go over the convex and make a shortcut flow from the upstream region to the downstream region. In the case where the fluid is a gas, part of the gas may not flow through its original flow path but may go over the convex to directly reach the downstream region. Such a shortcut gas flow may lead to the occurrence of a partial area with an insufficient gas flow and lower the power generation efficiency. In the case where the fluid is a refrigerant, part of the refrigerant may not flow through its original flow path but may go over the convex to directly reach the downstream region. Such a shortcut refrigerant flow may lead to the occurrence of a partial area with an insufficient refrigerant flow and lower the cooling efficiency.

DISCLOSURE OF THE INVENTION

With a view to solving at least part of the problem of the prior art discussed above, it would be required to prevent a potential trouble caused by deformation of a separator due to a pressure difference between flow pressures of respective fluids flowing on respective sides of the separator.

In order to accomplish at least part of the requirement mentioned above and the other relevant requirements, a first aspect of the invention is directed to a gas separator for a fuel cell. The gas separator according to the first aspect of the invention has a concavo-convex structure formed in mutually reversed shapes on two opposite sides of the gas separator to define flow paths of different fluids on the respective two sides. The concavo-convex structure includes multiple first projections formed and protruded on one side of the two opposite sides and arranged at intervals having a preset regularity. The concavo-convex structure, also includes multiple second projections formed and protruded on the other side of the two opposite sides in a specific area corresponding to an area for formation of the multiple first projections on the one side and arranged at intervals having a preset regularity. The concavo-convex structure further includes a reinforcing element protruded on the one side and formed as a convex in a specific shape of connecting multiple positions where the first projections are expected to be formed according to the preset regularity, while avoiding positions corresponding to the second projections formed on the other side.

In the gas separator for the fuel cell according to the first aspect of the invention, the reinforcing element is formed in the specific shape of connecting the multiple positions where the first projections are expected to be formed according to the preset regularity of the intervals of the first convexes. The presence of the reinforcing element preferably enhances the rigidity of the separator at a location close to the reinforcing element and thereby prevents deformation of the separator. This arrangement thus effectively avoids an increase of the contact resistance of the separator against an adjacent member. The formation of the reinforcing element in the specific shape of connecting the multiple positions where the first projections are to be formed according to the preset regularity desirably restricts the potential effect of the presence of the reinforcing element on the concavo-convex structure on the one side. The reinforcing element is formed by avoiding the positions corresponding to the second projections formed and protruded on the other side. This arrangement desirably restricts the potential effect of the presence of the reinforcing element on the fluid flow on the other side.

In one preferable application of the gas separator for the fuel cell according to the first aspect of the invention, the reinforcing element is formed in a specific shape of connecting multiple positions along a direction of a fluid flow running through a flow path formed on the one side, where the first projections are expected to be formed. This arrangement desirably restricts the potential effect of the presence of the reinforcing element on the fluid flow on the one side.

In one preferable embodiment of the invention, the gas separator for the fuel cell according to the first aspect further has a parting linear convex formed and protruded on either one of the two opposite sides to be extended in a specified direction in a power generation area with the concavo-convex structure formed therein, the parting linear convex parting the power generation area into a parted region corresponding to an upstream section of a fluid flow on the side with the parting linear convex and a parted region corresponding to a downstream section of the fluid flow. The reinforcing element is arranged along the parting linear convex. In the gas separator of this embodiment, the formation of the reinforcing element effectively enhances the rigidity of the separator at a location close to the parting linear convex and thereby prevents deformation of the separator. This arrangement effectively prevents the fluid flow from going over the parting linear convex or a path short cut of the fluid flow on the side with the parting linear convex formed and protruded thereon. Preventing the path short cut of the fluid flow effectively avoids a decrease of the utilization rate of the fluid. In the gas separator for the fuel cell of this embodiment according to the first aspect of the invention, the first projections and the second projections may be arranged alternately at equal intervals both in a direction parallel to and in a direction perpendicular to the parting linear convex.

In one preferable structure of the gas separator for the fuel cell of this embodiment according to the first aspect of the invention, the reinforcing element is formed in a specific shape of connecting multiple positions along the parting linear convex, where the first projections are expected to be formed. In another preferable structure of the gas separator for the fuel cell of this embodiment according to the first aspect of the invention, the reinforcing element includes multiple convexes formed by discretely connecting multiple positions, where the first projections are expected to be formed, and arranged along the parting linear convex. Either of these structures desirably enhances the rigidity of the separator at the location close to the parting linear convex.

In one preferable application of the gas separator for the fuel cell of this embodiment according to the first aspect of the invention, the parting linear convex is formed on each side of the parting linear convex. This arrangement has the better effect of enhancing the rigidity of the separator at the location close to the parting linear convex.

In another preferable application of the gas separator for the fuel cell of this embodiment according to the first aspect of the invention, the parting linear convex is formed and protruded on the other side of the two opposite sides. This application is suitable for the condition that the fluid flowing on the one side has a higher flow pressure than the fluid flowing on the other side. In this condition, this arrangement effectively prevents deformation of the separator due to a pressure difference between the flow pressures of the respective fluids on the respective sides and has the better effect of preventing the path short cut of the fluid flow over the parting linear convex.

In one preferable embodiment of the gas separator for the fuel cell in this application according to the first aspect of the invention, a flow path of one fluid is formed on the other side by connecting the parted regions, which are parted by the parting linear convex, in series via a connection area formed close to one end of the parting linear convex. A flow path of another fluid is formed on the one side to introduce the another fluid in one fixed direction parallel to the parting linear convex. This arrangement effectively prevents the fluid flow running in the flow path formed on the other side by connecting the parted regions in series via the connection area from being affected by the reinforcing element. The arrangement of the reinforcing element along the parting linear convex desirably restricts the potential effect of the presence of the reinforcing element on the fluid flow in parallel with the parting linear convex on the one side.

A second aspect of the invention is directed to a gas separator for a fuel cell. The gas separator according to the second aspect of the invention has a concavo-convex structure formed in mutually reversed shapes on two opposite sides of the gas separator to define a flow path of a first fluid on one side of the two opposite sides and a flow path of a second fluid on the other side of the two opposite sides. The concavo-convex structure includes a parting linear convex formed and protruded on the one side to be extended in a specified direction from one end thereof located on an outer circumference of a power generation area with the concavo-convex structure formed therein, the parting linear convex parting the power generation area into an upstream parted region where the first fluid flows in the specified direction and a downstream parted region where the first fluid flows in a direction reverse to the flow direction in the upstream parted region, wherein the downstream parted region is connected in series with the upstream parted region and is located in downstream of the upstream parted region. The concavo-convex structure also includes a reinforcing element formed and protruded as a convex on the other side and arranged in a neighborhood of the one end of the parting linear convex and along the parting linear convex to be located in at least one of an inflow area of the first fluid where the first fluid flows into the upstream parted region and an outflow area of the first fluid where the first fluid flows out of the downstream parted region on the one side.

In the gas separator for the fuel cell according to the second aspect of the invention, the reinforcing element is provided along the parting linear convex. The presence of the reinforcing element effectively enhances the rigidity of the separator at a location close to the parting linear convex and thereby prevents deformation of the separator. This arrangement desirably avoids an increase of the contact resistance of the gas separator against an adjacent member. The presence of the reinforcing element effectively prevents the fluid flow from going over the parting linear convex or a path short cut of the fluid flow on the one side, thus avoiding a decrease of the utilization rate of the fluid. In the gas separator of the second aspect, the reinforcing element is formed and protruded on the other side, which is opposite to the one side with the parting linear convex formed thereon. This structure is especially suitable for the condition that the fluid flowing on the one side has a higher flow pressure than the fluid flowing on the other side. In this condition, this arrangement effectively prevents deformation of the gas separator.

In one preferable application of the gas separator for the fuel cell according to the second aspect of the invention, the concavo-convex structure forms the flow path of the second fluid over a whole area including the upstream parted region, the downstream parted region, and the parting linear convex on the other side to make the second fluid flow in one fixed direction parallel to the specified direction. This arrangement desirably restricts the potential effect of the reinforcing element arranged along the parting linear convex on the flow of the second fluid.

The technique of the invention is not restricted to the gas separator for the fuel cell having any of the arrangements or the configurations discussed above but may also be actualized by diversity of other applications, for example, a fuel cell including the gas separator having any of the arrangements and the configurations discussed above.

BEST MODES OF CARRYING OUT THE INVENTION

A. General Structure

Figure 1:
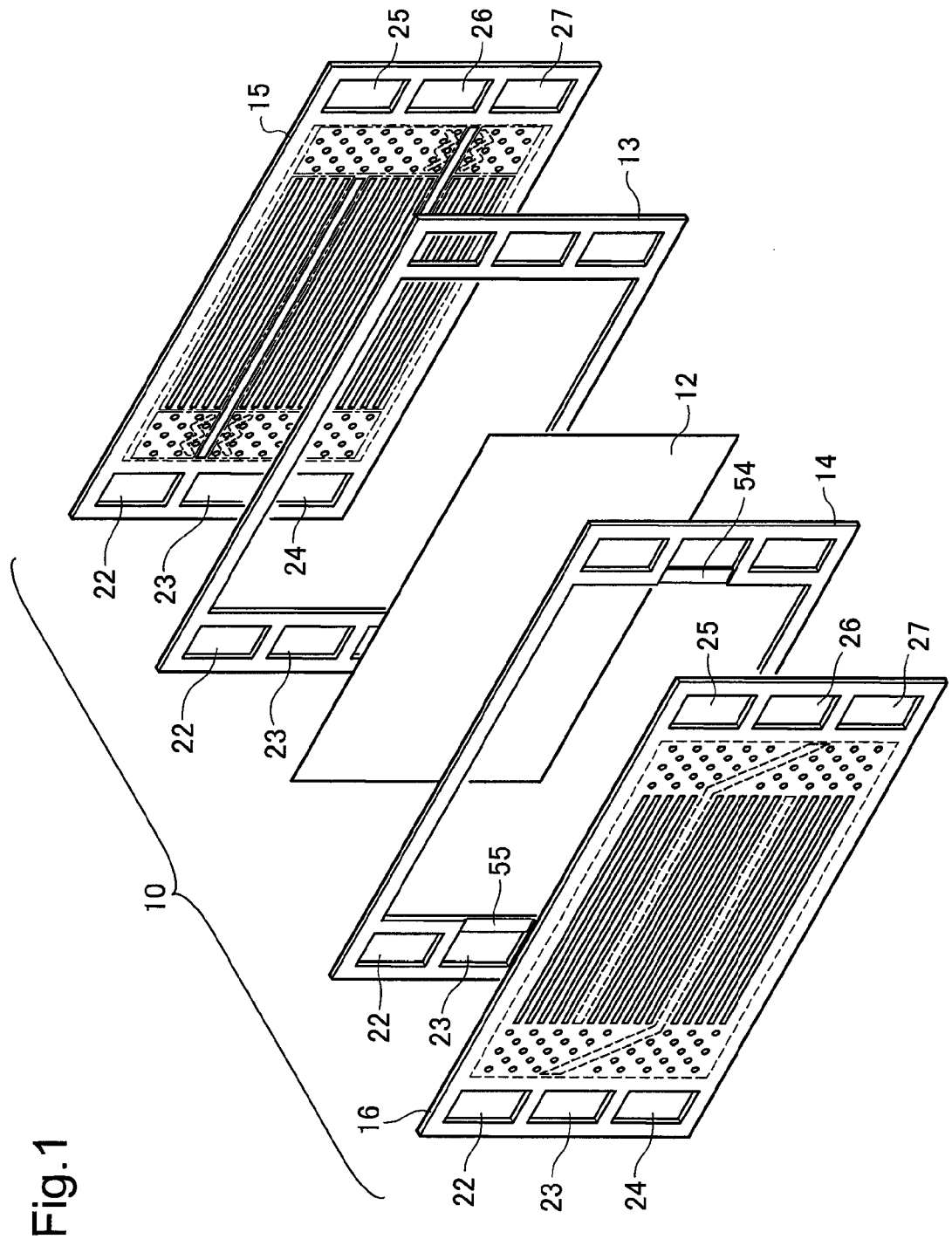
FIG. 1 is an exploded perspective view illustrating the schematic structure of a unit cell in a first embodiment of the invention.
Figure 2:
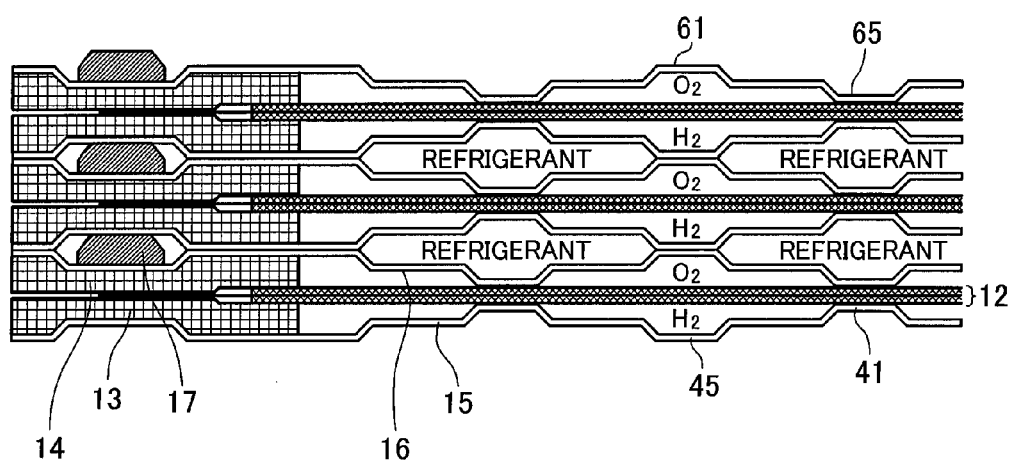
FIG. 2 is a schematic sectional view showing the structure of a fuel cell in the first embodiment.

FIG. 1 is an exploded perspective view schematically illustrating the structure of a unit cell in a first embodiment of the invention. FIG. 2 is a sectional view schematically illustrating the structure of a fuel cell in the first embodiment. The fuel cell of the first embodiment has a stack structure obtained by stacking multiple unit cells 10. The exploded perspective view of FIG. 1 shows the structure of one unit cell. The unit cell 10 includes a power generation assembly 12, a pair of resin frames 13 and 14 arranged across the power generation assembly 12 to support the outer circumference of the power generation assembly 12, and a pair of separators 15 and 16 arranged outside the resin frames 13 and 14 provided to support the power generation assembly 12.

The power generation assembly 12 includes an electrolyte membrane and a pair of electrodes formed on the two opposite sides of the electrolyte membrane. The fuel cell of this embodiment is a polymer electrolyte fuel cell. The electrolyte membrane is made of a solid polymer material, such as a proton-conductive ion exchange membrane of, for example, a fluororesin. An anode and a cathode formed as the pair of electrodes have a catalyst, such as platinum or a platinum alloy and are manufactured by making the catalyst supported on electrically-conductive carriers. A concrete manufacturing procedure prepares electrode paste including carbon particles with the catalyst supported thereon and an electrolyte similar to the polymer electrolyte of the electrolyte membrane and applies the electrode paste on the respective sides of the electrolyte membrane to form the anode and the cathode. The power generation assembly 12 of the embodiment also includes gas diffusion layers that are provided on the respective electrodes and are made of a porous material with electrical conductivity, such as carbon paper.

The resin frames 13 and 14 are interposed between the power generation assembly 12 and the separators 15 and 16 to assure the gas sealing properties in gas flow paths formed between the power generation assembly 12 and the separators 15 and 16.

Each of the separators 15 and 16, in combination with each opposed side of the power generation assembly 12, defines a gas flow path for a reactive gas (a hydrogen-containing fuel gas or an oxygen-containing oxidation gas). The separators 15 and 16 respectively have concavo-convex structures on their respective surfaces to form the gas flow paths. In the structure of this embodiment, the separators 15 and 16 are substantially rectangular metal thin plate members press worked to form the concavo-convex structures with holes provided at predetermined positions. In each of the separators 15 and 16 manufactured by press working the metal thin plates to have the concavo-convex structures, the concavo-convex structure formed on its surface and the concavo-convex structure formed on its rear side have mutually reversed shapes. The mutually reversed shapes satisfy a specific relation that the convex shape formed on its surface defines the concave shape on its rear side and that the concave shape formed on its surface defines the convex shape on its rear side. Namely the concavo-convex structure formed on the surface of each of the separators 15 and 16 is reversed to the concavo-convex structure on the rear side of each of the separators 15 and 16. The concavo-convex structure of the separator 15 forms an inner-unit cell fuel gas flow path as a passage for the fuel gas between the separator 15 and the power generation assembly 12. In the illustration of FIG. 2, spaces for the inner-unit cell fuel gas flow path are shown by indication of '$H_2$'. Similarly the concavo-convex structure of the separator 16 forms an inner-unit cell oxidation gas flow path as a passage for the oxidation gas between the separator 16 and the power generation assembly 12. In the illustration of FIG. 2, spaces for the inner-unit cell oxidation gas flow path are shown by indication of '$O_2$'. The concavo-convex structure formed on the separator 15 included in one unit cell 10 and the concavo-convex structure formed on the separator 16 included in an adjacent unit cell 10 define an inter-cell refrigerant flow path as a passage for a refrigerant. In the illustration of FIG. 2, spaces for the inter-cell refrigerant flow path are shown by indication of 'refrigerant'.

Figure 3A:
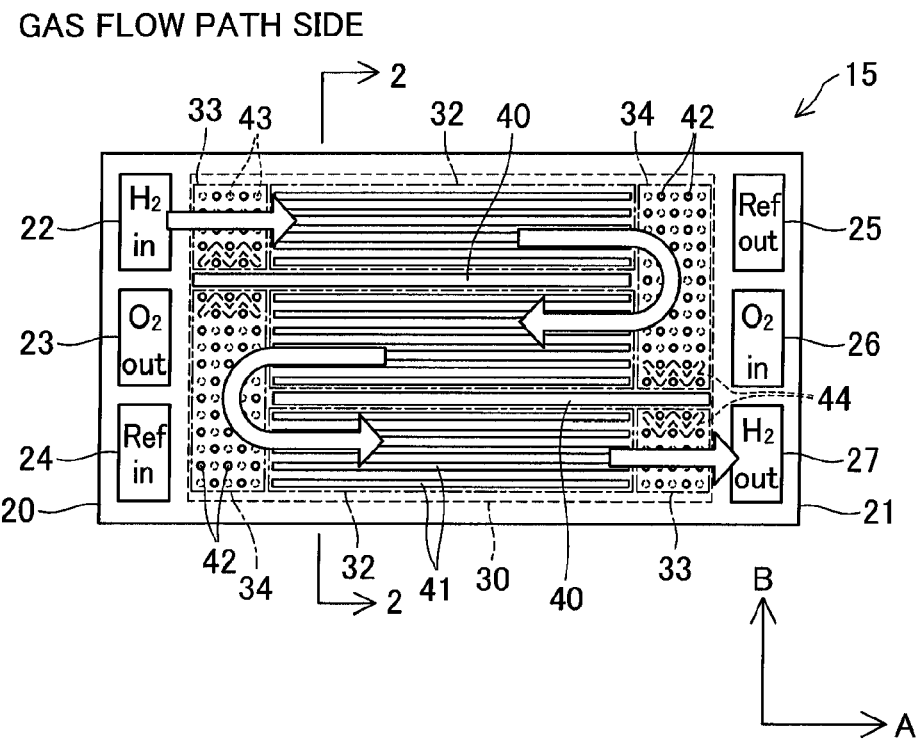
FIGS. 3(A) and 3(B) are plan views showing the structure of a separator 15.
Figure 3B:
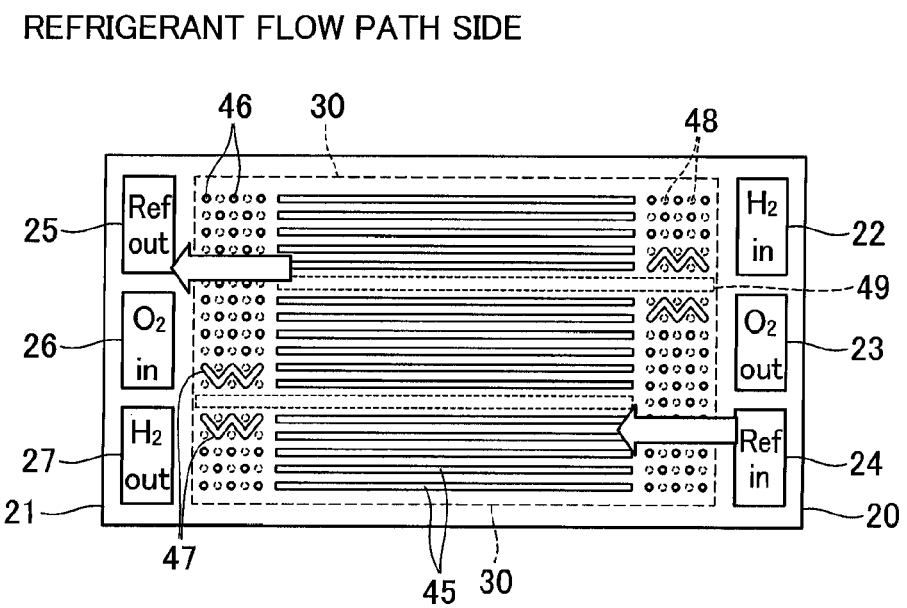

FIGS. 3(A) and 3(B) are plan views showing the structure of the separator 15. FIG. 3(A) shows a gas flow path side of the separator 15 that, in combination with the opposed side of the power generation assembly 12, defines the inner-unit cell fuel gas flow path. FIG. 3(B) shows a refrigerant flow path side of the separator 15 that, in combination with the opposed side of the separator 16 included in an adjacent unit cell 10, defines the inter-cell refrigerant flow path. In the illustration of FIG. 3(A), an arrow A and an arrow B respectively represent a direction corresponding to a horizontal direction and a direction corresponding to a vertical direction in the installation orientation of the fuel cell.

The separator 15 has six holes on its outer circumference thereof. Holes 22, 23, and 24 are formed in this sequence downward in the vertical direction along a vertical side 20 as shown in FIG. 3(A). Holes 25, 26, and 27 are formed in this sequence downward in the vertical direction along a vertical side 21, which is opposed to the side 20 as shown in FIG. 3(A). The separator 16 and the resin frames 13 and 14 similarly have the corresponding holes 22 through 27 formed therein as discussed later. In the assembled fuel cell by stacking the separators 15 and 16 and the resin frames 13 and 14, each set of the corresponding holes are aligned in a stacking direction to form one fluid flow path that passes through the inside of the fuel cell in the stacking direction. A set of the holes 22 are aligned to form a fuel gas supply manifold (expressed as '$H_2$ in' in the illustrations of FIGS. 3 through 6) to make a flow of the fuel gas that is externally supplied to the fuel cell and is distributed into the respective inner-unit cell fuel gas flow paths. A set of the holes 27 are aligned to form a fuel gas exhaust manifold (expressed as '$H_2$ out' in the illustrations of FIGS. 3 through 6) to discharge the fuel gas emission after the electrochemical reactions in the respective unit cells from the fuel cell. A set of the holes 26 are aligned to form an oxidation gas supply manifold (expressed as '$O_2$ in' in the illustrations of FIGS. 3 through 6) to make a flow of the oxidation gas that is externally supplied to the fuel cell and is distributed into the respective inner-unit cell oxidation gas flow paths. A set of the holes 23 are aligned to form an oxidation gas exhaust manifold (expressed as '$O_2$ out' in the illustrations of FIGS. 3 through 6) to discharge the oxidation gas emission after the electrochemical reactions in the respective unit cells from the fuel cell. A set of the holes 24 are aligned to form a refrigerant supply manifold (expressed as 'Ref in' in the illustrations of FIGS. 3 through 6) to make a flow of the refrigerant that is externally supplied to the fuel cell and is distributed into the inter-cell refrigerant flow paths. A set of the holes 25 are aligned to form a refrigerant discharge manifold (expressed as 'Ref out' in the illustrations of FIGS. 3 through 6) to discharge the refrigerant, which has flowed through the respective inter-cell refrigerant flow paths, from the fuel cell.

The gas flow path side of the separator 15 has a first concavo-convex structure that, in combination with the opposed side of the power generation assembly 12, forms an inner wall side of the inner-unit cell fuel gas flow path. A substantially rectangular area that includes the first concavo-convex structure formed therein and makes the flow of the fuel gas on the surface thereof is hereafter referred to as 'power generation area 30'. The power generation area 30 is an area encircled by a broken line in FIG. 3(A). In this embodiment, the first concavo-convex structure is formed in a substantially rectangular shape and includes two parting linear convexes 40, a large number of inner-parted region linear convexes 41, and a large number of projections 42 as salients.

The two parting linear convexes 40 are extended in a substantially a horizontal direction through the power generation area 30. One parting linear convex 40 has one end that reaches a specific side on the outer circumference of the power generation area 30 close to the side 20 of the separator 15 and the other end that is apart from a specific side on the outer circumference of the power generation area 30 close to the side 21 opposed to the side 20 of the separator 15. The other parting linear convex 40 has one end that reaches the specific side on the outer circumference of the power generation area 30 close to the side 21 of the separator 15 and the other end that is apart from the specific side on the outer circumference of the power generation area 30 close to the side 20 opposed to the side 21 of the separator 15.

The inner-parted region linear convexes 41 are extended in the substantially horizontal direction and are formed to have both ends apart from the outer circumference of the power generation area 30. A preset number (five in the illustrated embodiment) of multiple inner-parted region linear convexes 41 are collectively provided between the two parting linear convexes 40 and between the respective parting linear convexes 40 and the outer circumference of the power generation area 30. Each of sectional areas segmented by the parting linear convexes 40 to include the preset number of multiple inner-parted region linear convexes 41 is hereafter referred to as 'parted region 32'. In the structure of this embodiment, the two parting linear convexes 40 form three parted regions 32. The respective parted regions 32 are encircled by one-dot chain lines in FIG. 3(A).

The projections 42 are formed outside the parted regions 32 and are arranged in a regular manner or at intervals having a preset regularity in each gas flow area that makes an incoming flow of a gas into the parted region 32 or an outgoing flow of the gas from the parted region 32. In the embodiment, inflow outflow areas 33 and connection areas 34 are included in the gas flow areas with the projections 42. The inflow outflow areas 33 are provided in the vicinity of the hole 22 and in the vicinity of the hole 27. Each of the inflow outflow areas 33 is defined by one end of the parted region 32, part of the outer circumference of the power generation area 30, and part of the parting linear convex 40. Each of the connection areas 34 includes a separate region formed between the other end of the parting linear convex 40 and part of the outer circumference of the power generation area 30 and is defined by respective ends of two adjacent parted regions 32, part of the outer circumference of the power generation area 30, and part of the parting linear convex 40. The inflow outflow areas 33 and the connection areas 34 are encircled by two-dot chain lines in FIG. 3(A). The inflow outflow areas 33 and the connection areas 34 also have a large number of recesses 43 arranged at intervals having the similar regularity to be located between the large number of projections 42 arranged at the intervals having the preset regularity. More specifically the projections 42 and the recesses 43 are alternately arranged at equal intervals both in a parallel direction and in a perpendicular direction to the parting linear convexes 40. The inflow output areas 33 and the connection areas 34 also have concaves 44 arranged on both sides of the respective parting linear convexes 40 to have a specific shape corresponding to the shape of reinforcing elements (discussed later).

The separator 15 of the embodiment has one parting linear convex 40 with its one end reaching the specific side on the outer circumference of the power generation area 30 close to the side 20 and one parting linear convex 40 with its one end reaching the specific side on the outer circumference of the power generation area 30 close to the side 21. The connection areas 34 are formed in the vicinity of the respective other ends of the two parting linear convexes 40. In the separator 15 of the embodiment, the three parted regions 32 are thus connected in series via the connection areas 34.

The refrigerant flow path side of the separator 15 has a second concavo-convex structure that is formed in a rear side area on the reverse of the power generation area 30 (in the description hereafter, the rear side area is also regarded as the power generation area 30) and, in combination with the opposed side of the separator 16, forms an inner wall side of the inter-cell refrigerant flow path. In this embodiment, the second concavo-convex structure includes a large number of refrigerant flow linear convexes 45, a large number of projections 46, and reinforcing elements 47 as salients (see FIG. 3(B)).

The refrigerant flow linear convexes 45 are extended in the substantially horizontal direction to have both ends apart from the outer circumference of the power generation area 30. The refrigerant flow linear convexes 45 are formed as the reverse shape of grooves formed between the adjacent inner-parted region linear convexes 41 and between the inner-parted region linear convex 41 and the parting linear convex 40 on the gas flow path side of the separator 15. The projections 46 are formed as the reverse shape of the recesses 43 on the gas flow path side of the separator 15 to be arranged in rear side areas on the reverse of the inflow outflow areas 33 and the connection areas 34 on the gas flow path side of the separator 15. The refrigerant flow path side of the separator 15 has recesses 48 formed as the reverse shape of the projections 42 on the gas flow path side.

The reinforcing elements 47 are the characteristic structure in the fuel cell of the embodiment. The reinforcing elements 47 are convexes formed in the rear side areas on the reverse of the inflow outflow areas 33 and the connection areas 34 on the gas flow path side of the separator 15 to be located in the vicinity of grooves 49 formed as the reverse shape of the parting linear convexes 40 on the gas flow path side of the separator 15. Each of the reinforcing elements 47 is formed in a specific shape defined by connecting multiple positions along the groove 49, where the projections 46 are expected to be formed according to the regularity of the intervals of the projections 46 in the rear side areas on the reverse of the inflow outflow areas 33 and the connection areas 34, while avoiding the positions of the recesses 48 formed as the reverse shape of the projections 42 on the gas flow path side. Namely the reinforcing element 47 is a zigzag-shaped linear convex having bends along the recesses 48. The two reinforcing elements 47 provided along and both sides of the groove 49 as the reverse shape of each of the parting linear convexes 40 are arranged substantially in parallel with each other.

Figure 4A:
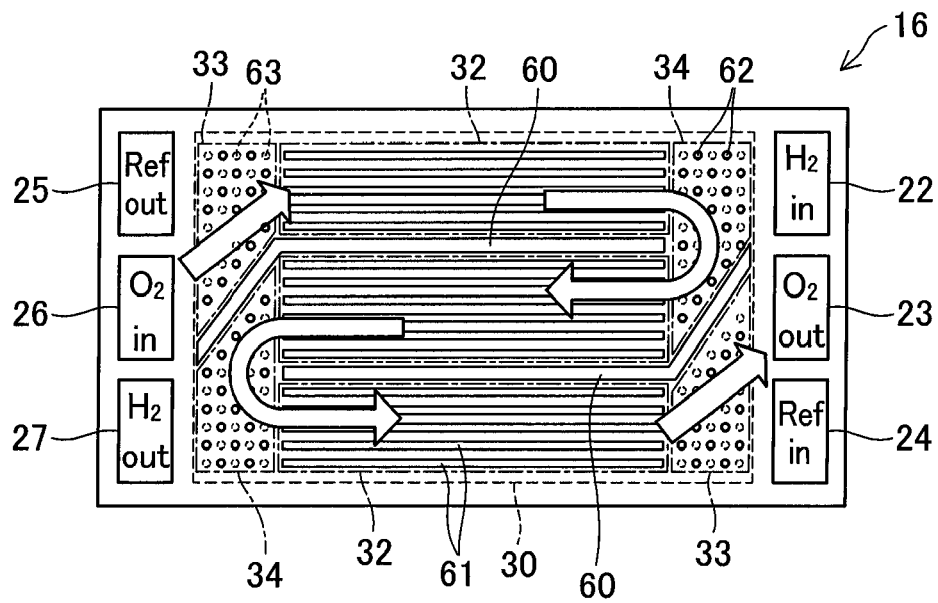
FIGS. 4(A) and 4(B) are plan views showing the structure of a separator 16.
Figure 4B:
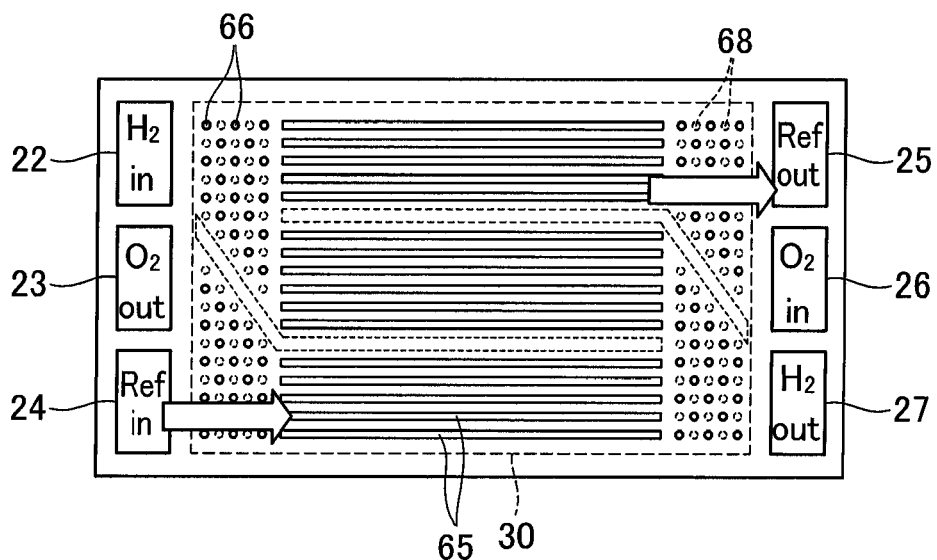

FIGS. 4(A) and 4(B) are plan views showing the structure of the separator 16. FIG. 4(A) shows a gas flow path side of the separator 16 that, in combination with the opposed side of the power generation assembly 12, defines the inner-unit cell oxidation gas flow path. FIG. 4(B) shows a refrigerant flow path side of the separator 16 that, in combination with the opposed side of the separator 15 included in an adjacent unit cell 10, defines the inter-cell refrigerant flow path. The separator 16 is a metal thin plate member that has substantially the same outer circumferential shape as that of the separator 15 and is press worked to form the concavo-convex structure with holes provided at predetermined positions.

The gas flow path side of the separator 16 has a first concavo-convex structure that, in combination with the opposed side of the power generation assembly 12, forms an inner wall side of the inner-unit cell oxidation gas flow path. A substantially rectangular area that includes the first concavo-convex structure formed therein and makes the flow of the fuel gas on the surface thereof is hereafter referred to as 'power generation area 30'. The power generation area 30 is an area encircled by a broken line in FIG. 4(A). In this embodiment, the first concavo-convex structure includes two parting linear convexes 60, a large number of inner-parted region linear convexes 61, and a large number of projections 62 as salients.

Like the inner-parted region linear convexes 41 formed on the gas flow path side of the separator 15, the inner-parted region linear convexes 61 are extended in the substantially horizontal direction and are formed to have both ends apart from the outer circumference of the power generation area 30. A preset number (five in the illustrated embodiment) of multiple inner-parted region linear convexes 61 are collectively provided between the two parting linear convexes 60 and between the respective parting linear convexes 60 and the outer circumference of the power generation area 30 to define each parted region 32. Like the parting linear convexes 40 formed on the gas flow path side of the separator 15, each of the parting linear convexes 60 is designed to have one end that reaches the outer circumference of the power generation area 30 and the other end that is apart from the outer circumference of the power generation area 30. The parting linear convexes 60 are provided between the adjacent parted regions 32. Each of the parting linear convexes 60 includes a horizontal section that has a length equivalent to that of the inner-parted region linear convexes 61 and is extended in the substantially horizontal direction through the power generation area 30, and an inclined section that is inclined to the horizontal direction and reaches the outer circumference of the power generation area 30. In the structure of this embodiment, the two parting linear convexes 60 form three parted regions 32.

The projections 62 are formed outside the parted regions 32 and are arranged at intervals having a preset regularity in each gas flow area that makes an incoming flow of a gas into the parted region 32 or an outgoing flow of the gas from the parted region 32. The gas flow areas include inflow outflow areas 33 and connection areas 34. The inflow outflow areas 33 are provided in the vicinity of the holes 25 and 26 and in the vicinity of the holes 23 and 24. Each of the inflow outflow areas 33 is defined by one end of the parted region 32, part of the outer circumference of the power generation area 30, and the inclined section of the parting linear convex 60. Each of the connection areas 34 includes a separate region formed between the other end of the parting linear convex 40 and part of the outer circumference of the power generation area 30 and is defined by respective ends of two adjacent parted regions 32, part of the outer circumference of the power generation area 30, and the inclined section of the parting linear convex 40. The inflow outflow areas 33 and the connection areas 34 are encircled by two-dot chain lines in FIG. 4(A). The inflow outflow areas 33 and the connection areas 34 also have a large number of recesses 63 arranged at intervals having the similar regularity to be located between the large number of projections 62 arranged at the intervals having the preset regularity. In the separator 16 of the embodiment, the two parting linear convexes 60 interconnect the three parted regions 32 in series via the two connection areas 34.

The refrigerant flow path side of the separator 16 has a second concavo-convex structure that is provided in the power generation area 30 and, in combination with the opposed side of the separator 15, forms an inner wall side of the inter-cell refrigerant flow path. In this embodiment, the second concavo-convex structure includes a large number of refrigerant flow linear convexes 65 and a large number of projections 66 as salients.

Like the refrigerant flow linear convexes 45 formed on the separator 15, the refrigerant flow linear convexes 65 are extended in the substantially horizontal direction to have both ends apart from the outer circumference of the power generation area 30. The refrigerant flow linear convexes 65 are formed as the reverse shape of grooves formed between the adjacent inner-parted region linear convexes 61 and between the inner-parted region linear convex 61 and the parting linear convex 60 on the gas flow path side of the separator 16. The projections 66 are formed as the reverse shape of the recesses 63 on the gas flow path side of the separator 16. The refrigerant flow path side of the separator 16 has recesses 68 formed as the reverse shape of the projections 62 on the gas flow path side.

Figure 5:
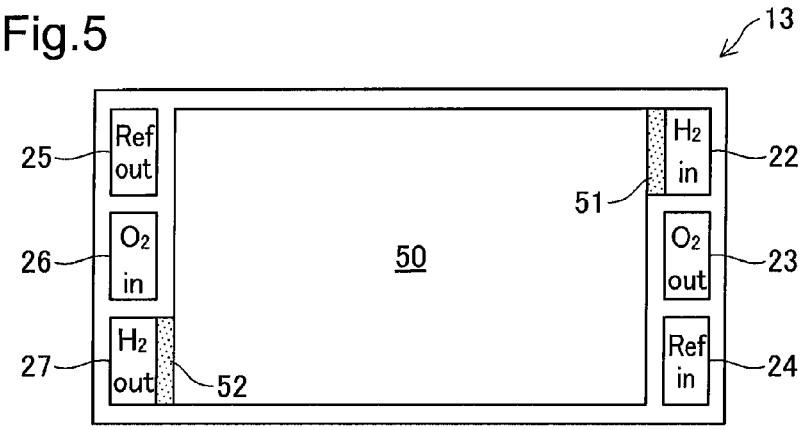
FIG. 5 is a plan view showing the schematic structure of a resin frame 13.

FIG. 5 is a plan view showing the schematic structure of the resin frame 13. One side of the resin frame 13 in contact with the gas flow path side of the separator 15 is shown in FIG. 5. The resin frame 13 has a center hole 50 formed in a central region thereof. The center hole 50 is formed in a substantially rectangular shape to be slightly smaller than the size of the power generation assembly 12. The resin frame 13 also has a recess 51 formed to connect the hole 22 with the center hole 50 and a recess 52 formed to connect the hole 27 with the center hole 50. The recess 51 and the opposed side of the separator 15 define a flow path for connecting the fuel gas supply manifold defined by the set of the holes 22 with the inner-unit cell fuel gas flow path. The recess 52 and the opposed side of the separator 15 define a flow path for connecting the fuel gas exhaust manifold defined by the set of the holes 27 with the inner-unit cell fuel gas flow path.

Figure 6:
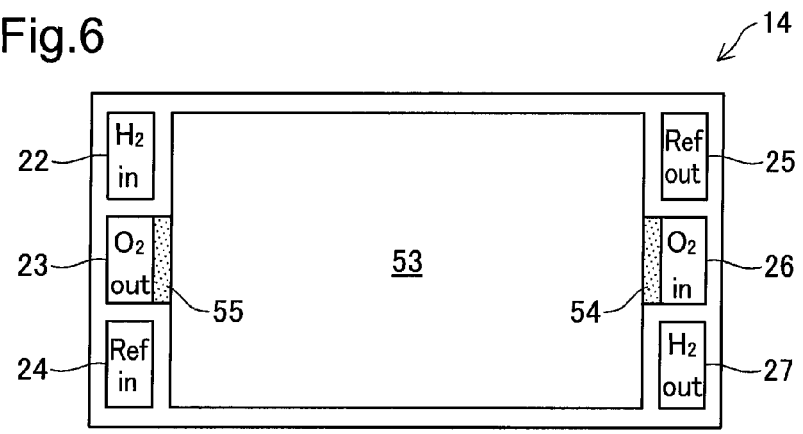
FIG. 6 is a plan view showing the schematic structure of a resin frame 14.

FIG. 6 is a plan view showing the schematic structure of the resin frame 14. One side of the resin frame 14 in contact with the gas flow path side of the separator 16 is shown in FIG. 6. The resin frame 14 has a center hole 53 formed in a central region thereof to have the same shape as and to be aligned with the center hole 50 of the resin frame 13. The resin frame 14 also has a recess 55 formed to connect the hole 23 with the center hole 53 and a recess 54 formed to connect the hole 26 with the center hole 53. The recess 55 and the opposed side of the separator 16 define a flow path for connecting the oxidation gas exhaust manifold defined by the set of the holes 23 with the inner-unit cell oxidation gas flow path. The recess 54 and the opposed side of the separator 16 define a flow path for connecting the oxidation gas supply manifold defined by the set of the holes 26 with the inner-unit cell oxidation gas flow path.

The resin frames 13 and 14 are made of an insulating resin material and are arranged to support the power generation assembly 12 interposed therebetween. This arrangement assures the insulation property between the two sides of the power generation assembly 12. The resin frames 13 and 14 are located between the power generation assembly 12 and the separators 15 and 16 having the concavo-convex structures of predetermined heights and function as spacers for maintaining distances corresponding to the concavo-convex structures of the predetermined heights between the power generation assembly 12 and the separators 15 and 16.

A procedure of assembling the fuel cell bonds the separator 15 to the resin frame 13 via a sealing member (not shown) made of, for example, an adhesive and similarly bonds the separator 16 to the resin frame 14 via a sealing member (not shown) made of, for example, an adhesive. The procedure subsequently locates the power generation assembly 12 between the resin frames 13 and 14 and bonds the power generation assembly 12 to the resin frames 13 and 14 via sealing members (not shown) made of, for example, an adhesive. This completes a unit cell of the fuel cell. The power generation assembly 12 is bonded to the resin frames 13 and 14 in such a manner that the center hole 50 of the resin frame 13 and the center hole 53 of the resin frame 14 are covered over with the power generation assembly 12. Stacking a preset number of the unit cells thus obtained via sealing members 17 (see FIG. 2) made of, for example, an adhesive completes the fuel cell stack. The presence of the sealing members between the respective adjacent members assures the sealing properties in the respective inner-unit cell gas flow paths and in the respective manifolds.

In assembly of the fuel cell by stacking the respective members, the parting linear convexes 40 on the separator 15 are arranged to be opposed to the horizontal sections of the parting linear convexes 60 on the separator 16 across the power generation assembly 12. Similarly the inner-parted region linear convexes 41 on the separator 15 are opposed to the inner-parted region linear convexes 61 on the separator 16. The projections 42 on the separator 15 are opposed to the projections 62 on the separator 16. The tops of the projections 46 on the separator 15 are in contact with the tops of the projections 66 on the adjacent separator 16. Such mutual support of the corresponding salients in the stacking direction assures the rigidity of the fuel cell as the whole stack structure. The cross section of FIG. 2 is cut in a direction perpendicular to the longitudinal direction of the respective linear convexes and is taken on a line 2-2 in FIG. 3(A). The sectional view of FIG. 2 specifically shows the cross section in the proximity of the outer circumference of the fuel cell including the resin frames 13 and 14.

In the assembled fuel cell, the fuel gas supplied to the fuel gas supply manifold formed by the set of holes 22 is distributed into the inner-unit cell fuel gas flow paths formed in the respective unit cells. The fuel gas in each inner-unit cell fuel gas flow path goes downward in the vertical direction as a whole, while running in the horizontal direction in the respective parted regions 32 as shown by open arrows in FIG. 3(A). The fuel gas flowed through the respective inner-unit cell fuel gas flow paths and subjected to the electrochemical reaction is discharged through the fuel gas exhaust manifold formed by the set of holes 27.

The oxidation gas supplied to the oxidation gas supply manifold formed by the set of holes 26 is distributed into the inner-unit cell oxidation gas flow paths formed in the respective unit cells. The oxidation gas in each inner-unit cell oxidation gas flow path goes upward in the vertical direction as a whole, while running in the horizontal direction in the respective parted regions 32 as shown by open arrows in FIG. 4(A). The oxidation gas flowed through the respective inner-unit cell oxidation gas flow paths and subjected to the electrochemical reaction is discharged through the oxidation gas exhaust manifold formed by the set of holes 23.

The refrigerant supplied to the refrigerant supply manifold formed by the set of holes 24 is distributed into the inter-cell refrigerant flow paths formed between the separator 15 of one unit cell and the separator 16 of an adjacent unit cell. The refrigerant in each inter-cell refrigerant flow path runs in the horizontal direction as a whole as shown by open arrows in FIGS. 3(B) and 4(B). The refrigerant flowed through the respective inter-cell refrigerant flow paths is collected and discharged into the refrigerant discharge manifold formed by the set of holes 25.

In the fuel cell of this embodiment, the oxidation gas flowing in the inner-unit cell oxidation gas flow path has a higher flow pressure than the fuel gas flowing in the inner-unit cell fuel gas flow path. The fuel gas and the oxidation gas have higher flow pressures than the refrigerant flowing in the inter-cell refrigerant flow path. In the structure of this embodiment, each of the separators 15 and 16 has the inflow output areas 33 and the connection areas 34 that are provided in the vicinity of the holes 22 through 27 for defining the respective manifolds and have the multiple projections 42 and 46 or 62 and 66 formed on its two opposite sides. This arrangement enables the concavo-convex structure formed in the mutually reversed shapes on the two opposite sides of each separator to define the serpentine gas flow path on one side and the straight refrigerant flow path on the other side. The presence of the multiple projections arranged apart from one another on the respective sides enables the flow of the refrigerant to be introduced in one fixed direction on one side, while enabling the flow of the gas to be reversed on the other side.

In the fuel cell of this embodiment constructed as discussed above, the reinforcing elements 47 are formed in the inflow outflow areas 33 and the connection areas 34 to be arranged along the respective parting linear convexes 40 on the separator 15. This structure desirably enhances the rigidity of the separator 15 at locations close to the respective parting linear convexes 40. The enhanced rigidity desirably prevents the separator 15 from being deformed at the locations close to the respective parting linear convexes 40. Even when the fuel gas flowing in the inner-unit cell fuel gas flow path has a higher flow pressure than the refrigerant flowing in the inter-cell refrigerant flow path, this arrangement effectively avoids a decrease of the contact pressure of the parting linear convexes 40 against the power generation assembly 12. Avoiding the decrease of the contact pressure of the parting linear convexes 40 desirably prevents the fuel gas flowing in the inner-unit cell fuel gas flow path from going over the parting linear convexes 40 and flowing down (this phenomenon is called 'path short cut' of the fuel gas flow) and thereby prevents a decrease of the rate of gas utilization. This arrangement also effectively avoids an increase of the resistance inside the fuel cell and thereby prevents deterioration of the cell performance.

Figure 7:
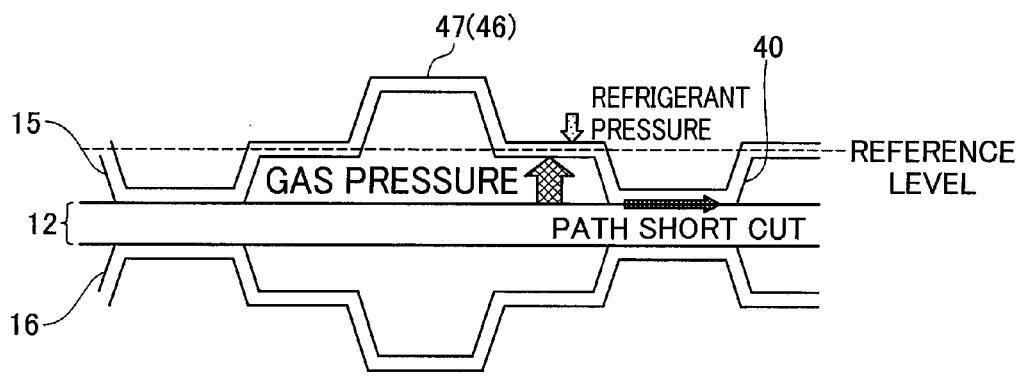
FIG. 7 is an explanatory view showing a path short cut of a fuel gas flow.

The path short cut of the fuel gas flow is discussed in detail. FIG. 7 is an enlarged schematic sectional view showing the partial sectional structure of the fuel cell of the embodiment with the power generation assembly 12 located on the center. As explained above, the separators 15 and 16 have the projections formed on the respective two opposite sides to be arranged at the corresponding positions. The projections formed on side of one separator and the projections formed on the opposed side of an adjacent separator are arranged to be opposed to each other and to be aligned in the fuel cell stack. In the structure of this embodiment, the projections are protruded in two opposite directions or in directions of two opposite sides from an original level of a metal plate used for the separator (hereafter referred to as 'reference level'). In the assembled fuel cell including these separators, as shown in FIG. 7, a pressure difference between the gas pressure and the refrigerant pressure has a significant influence at the position of the reference level where the separator is not in contact with nor supported by an adjacent separator. Such a pressure difference between the pressures applied on the two opposite sides of the separator 15 at the position of the reference level causes deformation (flexure) of the separator 15 around the projections 46, which are in contact with the projections 66 formed on the adjacent separator 16. Such deformation leads to a decrease of the contact pressure and an increase of the contact resistance of the salient (the parting linear convex 40 in the illustrated example of FIG. 7) formed on the separator 15 against the power generation assembly 12. The fuel gas accordingly goes over the parting linear convex 40. The parting linear convex 40 has the function of parting the upstream area from the downstream area in the inner-unit cell fuel gas flow path. The flow of the fuel gas going over the parting linear convex 40 causes a path short cut of the fuel gas flow and makes an area with an insufficient flow of the fuel gas in the inner-unit cell fuel gas flow path. This undesirably lowers the overall rate of gas utilization in the fuel cell.

In the structure of this embodiment, the reinforcing elements 47 having the shape of connecting multiple projections 46 are formed in the vicinity of and along each of the parting linear convexes 40, in place of the multiple projections 46 arranged apart from one another. This structure effectively enhances the rigidity of the separator 15 at the locations close to the respective parting linear convexes 40. Even when there is a significant pressure difference between the gas pressure and the refrigerant pressure applied on the two opposite sides in the inflow outflow areas 33 and the connection areas 34 at the position of the reference level, this arrangement effectively prevents deformation of the separator 15 at the locations close to the respective parting linear convexes 40 and desirably avoids a decrease of the contact pressure of the parting linear convexes 40 against the power generation assembly 12.

In the structure of the embodiment, the refrigerant flow path formed on the refrigerant flow path side of the separator 15 is arranged to make the flow of the refrigerant in one fixed direction substantially parallel to the parting linear convexes 40 formed as the salients on the gas flow path side of the separator 15. This arrangement effectively prevents the flow of the refrigerant from being interrupted by the reinforcing elements 47 formed as the salients on the refrigerant flow path side of the separator 15 to be arranged along the parting linear convexes 40.

The reinforcing element 47 of the embodiment is formed in the specific shape by connecting multiple positions along the parting linear convex 40, where the projections 46 are expected to be formed according to the regularity of the intervals of the projections 46 on the refrigerant flow path side, while avoiding the positions corresponding to the projections 42 on the gas flow path side. The presence of the reinforcing elements 47 formed by avoiding the positions corresponding to the projections 42 on the gas flow path side does not affect the configuration of the salients formed on the gas flow path side or thereby the gas flow on the gas flow path side. Each of the reinforcing elements 47 is formed by connecting the multiple positions expected to have the projections 46 on the refrigerant flow path side. This arrangement does not require a change of the whole pattern of the projections 46 and thereby restricts the influence of the presence of the reinforcing elements 47 on the configuration of the refrigerant flow path side.

The procedure of this embodiment presses a metal plate to form the separator 15. This simple press working method allows the reinforcing elements 47 for enhancing the rigidity of the separator 15 to be formed simultaneously with formation of the flow paths. The salients formed by press working the metal plate as the base of the separator 15 enhances the rigidity of the separator 15. There is thus no requirement for providing a separate member for enhancing the rigidity of the separator 15. The reinforcing elements 47 are formed as the simple zigzag-shaped linear convexes. A shaping die can thus be readily prepared to form the reinforcing elements 47 by press working.

The reinforcing element 47 may be formed only on one side of and along each parting linear convex 40. This arrangement also has the effect of enhancing the rigidity of the separator 15 at the locations close to the respective parting linear convexes 40. Formation of the reinforcing elements 47 on both sides of and along each parting linear convex 40 as in the structure of the embodiment desirably assures the higher effect of enhancing the rigidity of the separator 15.

Figure 8:
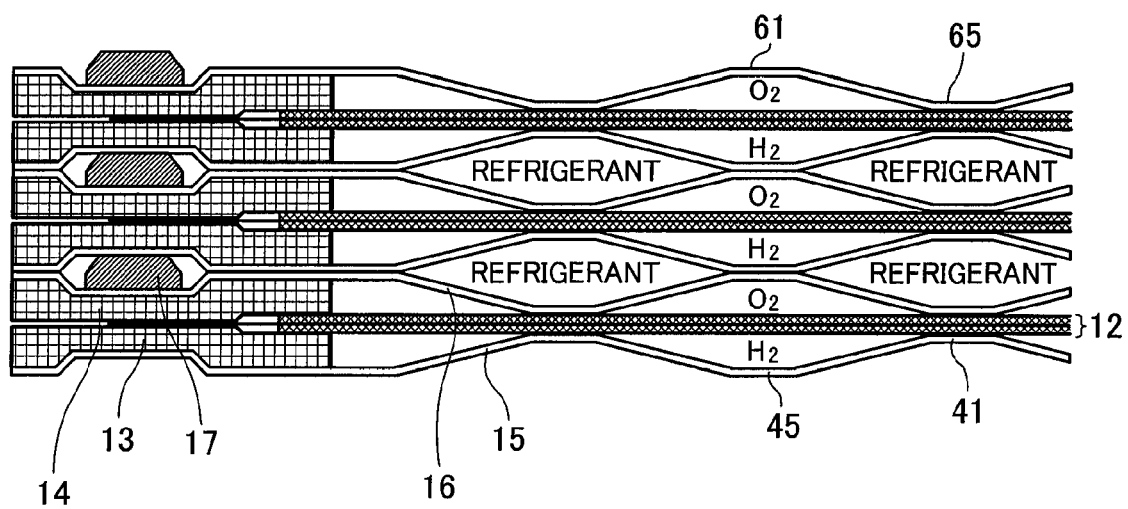
FIG. 8 is a schematic sectional view showing one modified structure of the fuel cell in one modified example of the first embodiment.

In the structure of this embodiment, the reinforcing elements 47 are formed along the respective parting linear convexes 47 in the inflow outflow areas 33 and in the connection areas 34. The parted regions 32 as the residual area on the separator 15 have the inner-parted region linear convexes 41 and the refrigerant flow linear convexes 45 formed substantially in parallel with the parting linear convexes 40 to assure the rigidity of the separator 15. Like the reference level shown in FIG. 7, there is a reference level between the inner-parted region linear convexes 41 formed on the gas flow path side of the separator 15 and the refrigerant flow linear convexes 45 formed on the refrigerant flow path side as shown in FIG. 2. This reference level is, however, not essentially required. In one modification, the tops of the inner-parted region linear convexes 41 formed on one side may be arranged to be linearly continuous with the tops of the refrigerant flow linear convexes 45 formed on the other side. One exemplary structure including the separators 15 and 16 of such modification is shown as one modified example of the first embodiment in the schematic sectional view of FIG. 8. The absence of the reference level significantly affected by the pressure difference between the gas pressure and the refrigerant pressure enhances the rigidity of the separator at the locations close to the respective parting linear convexes 40 in the area of the parted regions 32 and thereby prevents deformation of the separator caused by the pressure difference.

B. Second Embodiment

In the structure of the first embodiment, the reinforcing elements 47 are formed as the salients protruded on the refrigerant flow path side. Reinforcing elements may alternatively be formed as salients protruded on the gas flow path side. This modified structure is described below as a second embodiment. A fuel cell of the second embodiment has the same structure as that of the fuel cell of the first embodiment, except that the reparatory 15 is replaced with a separator 115. The like components of the second embodiment to those of the first embodiment are expressed by the like numerals and are not specifically explained here.

Figure 9A:
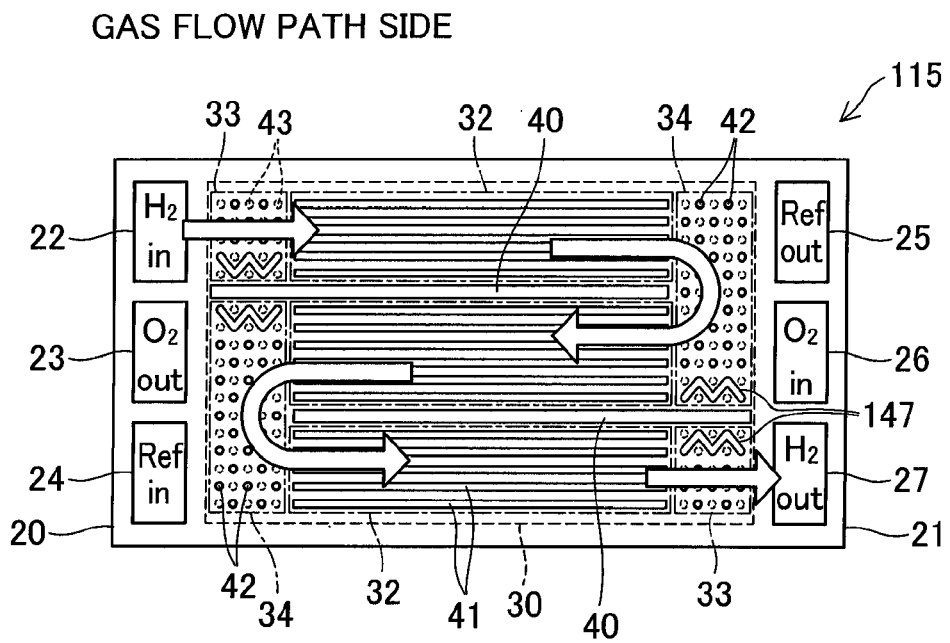
FIGS. 9(A) and 9(B) are plan views showing the structure of another separator 115.
Figure 9B:
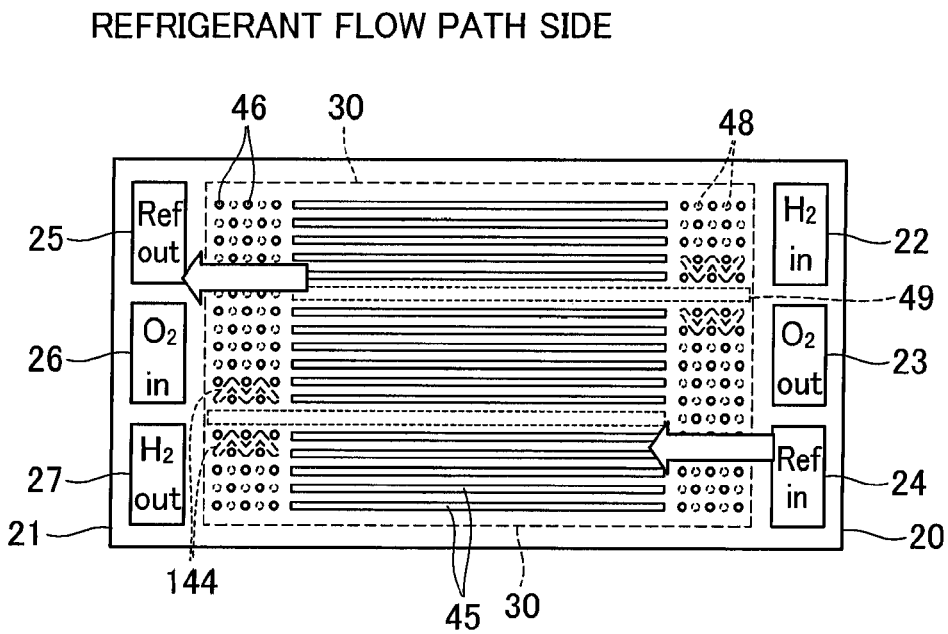

FIGS. 9(A) and 9(B) are plan views showing the structure of the separator 115 included in the fuel cell of the second embodiment. FIG. 9(A) shows a gas flow path side, and FIG. 9(B) shows a refrigerant flow path side. The separator 115 has the same structure as that of the separator 15, except that the reinforcing elements 47 are replaced by reinforcing elements 147. The reinforcing elements 147 of the second embodiment are formed and protruded on the gas flow path side of the separator 115 to be arranged along and on both sides of the respective parting linear convexes 40 in the inflow output areas 33 and in the connection areas 34. More specifically, each of the reinforcing elements 147 is formed in a specific shape by connecting multiple positions along the parting linear convex 40, where the projections 42 are expected to be formed according to the regularity of the intervals of the projections 42 on the gas flow path side, while avoiding the positions corresponding to the projections 46 on the refrigerant flow path side. The refrigerant flow path side accordingly has concaves 144 corresponding to the reinforcing elements 147.

As in the fuel cell of the first embodiment, in the fuel cell of the second embodiment constructed as discussed above, the presence of the reinforcing elements 147 effectively enhances the rigidity of the separator 115 at the locations close to the respective parting linear convexes 40. This arrangement effectively prevents a path short cut of the fuel gas flow to avoid a decrease of the rate of gas utilization, while avoiding an increase of the contact resistance of the parting linear convexes 40 against the power generation assembly 12. Such formation of the reinforcing elements 147 does not require a change of the overall configuration of the concavo-convex structure for defining the flow paths and restricts the possible influence on the gas flow and the refrigerant flow.

C. Other Aspects

The embodiments and their applications discussed above are to be considered in all aspects as illustrative and not restrictive. There may be many modifications, changes, and alterations without departing from the scope or spirit of the main characteristics of the present invention. Some examples of possible modification are given below.

C1. MODIFIED EXAMPLE 1

Figure 10:
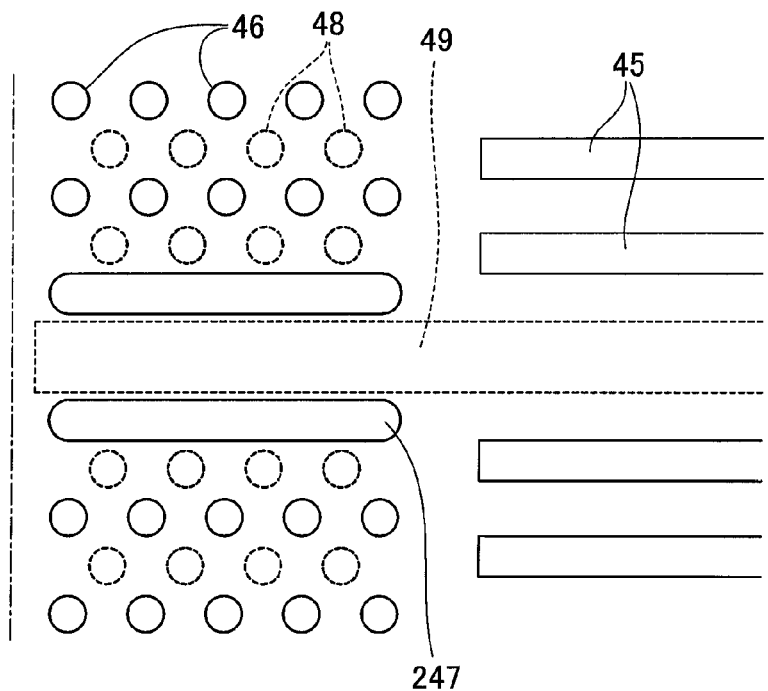
FIG. 10 is an explanatory view showing the structure of a first modified example.

In the first and the second embodiments, the reinforcing elements 47 and 147 are formed as the zigzag-shaped linear convexes with bends. This shape is, however, neither restrictive nor essential. Each of the reinforcing elements may be formed as a straight linear convex with no bends according to the arrangement of the projections 42 and 46 provided in the inflow outflow areas 33 and in the connection areas 34. One exemplary structure of such modification is shown as a first modified example in FIG. 10. The like components of the first modified example to those of the first embodiment are expressed by the like numerals and are not specifically explained here. FIG. 10 is an enlarged plan view showing a partial area of the refrigerant flow path side of the separator corresponding to the location in the vicinity of the parting linear convex 40. In the first modified example shown in FIG. 10, each of straight linear reinforcing elements 247 is formed by connecting multiple positions along the parting linear convex 40, where the projections 46 are expected to be formed according to the regularity of the intervals of the projections 46 on the refrigerant flow path side, while avoiding the positions of the recesses 48. The reinforcing element of this modified structure assures the similar effects to those of the first embodiment and the second embodiment discussed above.

C2. MODIFIED EXAMPLE 2

Figure 11:
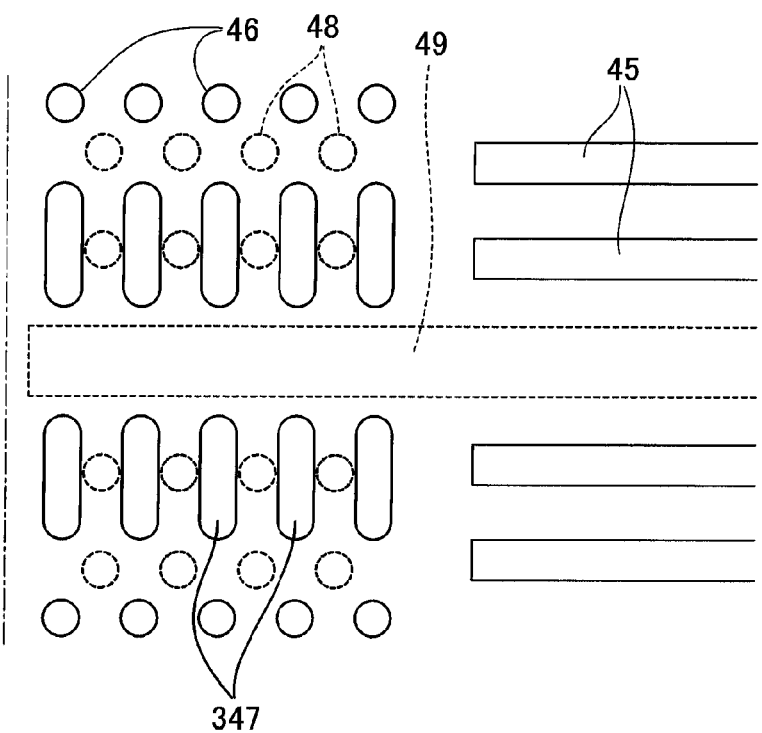
FIG. 11 is an explanatory view showing the structure of a second modified example.

In the first and the second embodiments, a single reinforcing element is formed on each side of and along each of the parting linear convexes 40 by connecting the positions where the projections 46 are expected to be formed according to the regularity of the intervals of the projections 46. In one modification, multiple convexes may be formed by discretely connecting certain positions where the projections 46 are expected to be formed and may constitute as a whole a reinforcing element arranged along each of the parting linear convexes 40. One exemplary structure of such modification is shown as a second modified example in FIG. 11. The like components of the second modified example to those of the first embodiment are expressed by the like numerals and are not specifically explained here. Like the illustration of FIG. 10, FIG. 11 is an enlarged plan view showing a partial area of the refrigerant flow path side of the separator corresponding to the location in the vicinity of the parting linear convex 40. In the second modified example shown in FIG. 11, multiple convexes 347 are arranged along the parting linear convex 40. Each of the multiple convexes 347 is formed by connecting two positions in the vertical direction where the projections 46 are expected to be formed on the refrigerant flow path side, while avoiding the positions of the recesses 48. In the second modified example, each of the convexes 347 is formed in a specific shape of connecting the two projections 46 in a direction perpendicular to the extending direction of the parting linear convex 40. The presence of the multiple convexes 347 formed discretely connecting the respective pairs of the projections 46 effectively enhances the rigidity of the separator at the location in the vicinity of the convexes 347. The arrangement of such convexes 347 along each of the parting linear convexes 40 enhances the rigidity of the separator in the vicinity of the parting linear convexes 40. As long as each of the reinforcing elements is arranged as a whole along the parting linear convex 40, the reinforcing element consisting of multiple discrete convexes assures the similar effects to those of the first embodiment and the second embodiment discussed above.

C3. MODIFIED EXAMPLE 3

In the first and the second embodiments, the projections 42 and the projections 46 are arranged at equal intervals both in the horizontal direction and in the vertical direction. This arrangement is, however, neither restrictive nor essential but may be changed according to the requirements. For example, the projections may be arranged not at equal intervals but at different intervals having a preset regularity. In this modification, the presence of reinforcing elements, each being formed in a specific shape of connecting multiple positions where projections are expected to be formed on the refrigerant flow path side, while avoiding the positions corresponding to the projections formed on the gas flow path side, assures the similar effects to those of the first embodiment and the second embodiment discussed above.

C4. MODIFIED EXAMPLE 4

Figure 12:
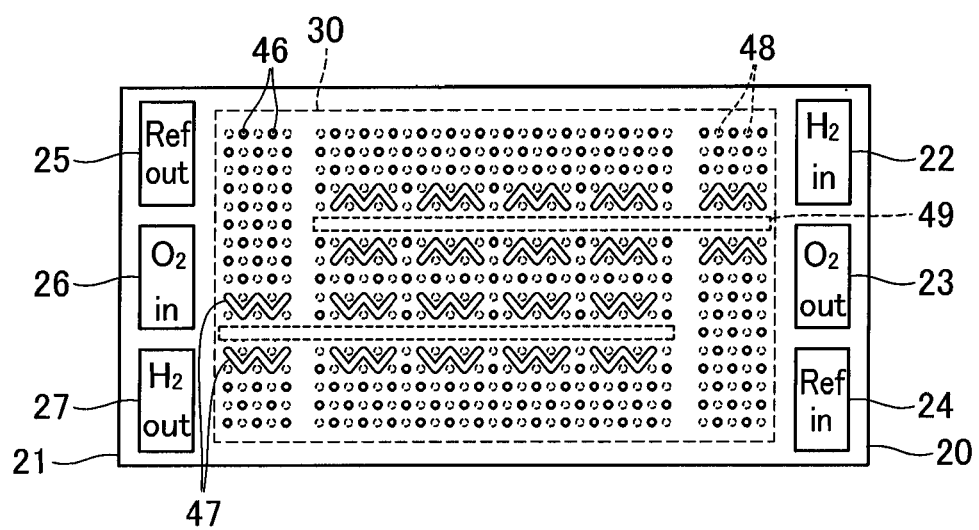
FIG. 12 is an explanatory view showing the structure of a third modified example.

In the first and the second embodiments, the inner-parted region linear convexes 41 and the refrigerant flow linear convexes 45 formed in the straight linear shapes are provided in the respective parted regions 32. This structure is, however, neither restrictive nor essential. For example, as in the convexes formed in the inflow outflow areas 33 and the connection areas 34, convexes formed and protruded on both sides and arranged at intervals having a preset regularity may be provided in the parted regions 32. In such modification, multiple reinforcing elements may be provided along each of the parting linear convexes 40 in the parted regions 32. Each of the reinforcing elements may be formed in a specific shape of connecting multiple positions where projections protruded on one side are expected to be formed in the parted region 32 according to the regularity of the intervals of the projections, while avoiding the positions corresponding to the projections formed and protruded on the other side. One exemplary structure of such modification is shown in FIG. 12. The like components of this modified example to those of the first embodiment are expressed by the like numerals and are not specifically explained here. FIG. 12 is a plan view showing the structure of a refrigerant flow path side of a separator for defining the inner-unit cell fuel gas flow path. This illustration corresponds to the illustration of FIG. 3(B). In this modified example, multiple reinforcing elements 47 are arranged along the respective parting linear convexes 40. Each of the reinforcing elements 47 is formed in a specific shape of connecting the projections to be formed on the refrigerant flow path side. In the separator of FIG. 12, each of the reinforcing elements 47 has the shape of connecting five positions along the parting linear convex 40, where the projections are expected to be formed. The number of projections to be connected to form each reinforcing element is, however, not restricted to five but may be varied according to the requirements. The structure of this modification effectively prevents deformation of the separator at the locations in the vicinity of the respective parting linear convexes and thus assures the similar effects to those of the first embodiment and the second embodiment discussed above.

C5. MODIFIED EXAMPLE 5

In the first and the second embodiments, the concavo-convex structure for defining the gas flow path and the refrigerant flow path is formed by working (press working) a metal plate used as the base of the separator. This manufacturing method is, however, neither restrictive nor essential. One modified procedure may provide the parting linear convexes 40 as separate members and bond the parting linear convexes 40 onto one side of the separator. Even when part of the structure is made of separate members having no mutually reversed shapes on its two opposite sides, the concavo-convex structure formed in the mutually reversed shapes on the two opposite sides of the separator to define the flow paths of the respective fluids as a whole and include the projections 42 and 46 for defining the arrangement of the reinforcing elements, in combination with the reinforcing elements of the above embodiment, assures the similar effects to those of the first embodiment and the second embodiment discussed above.

C6. MODIFIED EXAMPLE 6

In the first and the second embodiments, the reinforcing elements are provided on the separator 15 for defining the inner-unit cell fuel gas flow path. In one modification, reinforcing elements may be provided on the separator 16 for defining the inner-unit cell oxidation gas flow path. For example, reinforcing elements may be formed and protruded on the refrigerant flow path side of the separator 16 shown in FIG. 4 to be arranged along the inclined sections of the respective parting linear convexes 40. Each of the reinforcing elements may be formed in a specific shape of connecting positions along the inclined section of the parting linear convex 60, where the projections 66 are expected to be formed, while avoiding the positions of the recesses 68. This modified structure similarly enhances the rigidity of the separator 16 at the locations in the vicinity of the parting linear convexes 60 and thereby effectively prevents deformation of the separator 60 at the locations in the vicinity of the parting linear convexes 60. Especially when the oxidation gas has the higher flow pressure than the refrigerant, this arrangement effectively prevents a path short cut of the oxidation gas flow in the inner-unit cell oxidation gas flow path.

C7. MODIFIED EXAMPLE 7

In the fuel cells of the first embodiment and the second embodiment, there is the inter-cell refrigerant flow path provided between each pair of the adjacent unit cells 10. This structure is, however, not restrictive but may be modified according to the requirements. In one modification, there may be no refrigerant flow path formed in each pair of unit cells, and the fuel gas flow path and the oxidation gas flow path may be formed in mutually reversed shapes on two opposite sides of each separator. In such modification, parting linear convexes similar to those of the embodiment may be formed on one side of the separator to define a gas flow path, in which the direction of a gas flow is reversed in the middle. A gas flow path, in which another gas flow runs in one fixed direction, may be formed on the other side of the separator. The presence of reinforcing elements similar to those of the embodiment formed along the respective parting linear convexes assures the similar effects to those of the first embodiment and the second embodiment discussed above.

In another modification, parting linear convexes may be provided on a refrigerant flow path side of the separator to reverse the direction of the refrigerant flow in the middle. Formation of reinforcing elements along the respective parting linear convexes effectively prevents a path short cut of the refrigerant flow, thus avoiding a decrease of the cooling efficiency.

C8. MODIFIED EXAMPLE 8

In the first and the second embodiments, the reinforcing elements are formed along the respective parting linear convexes to prevent deformation of the separator at the locations in the vicinity of the reinforcing elements. In one modified structure, reinforcing elements may be formed at locations apart from the respective parting linear convexes. In a separator having multiple projections protruded on both sides in a fixed pattern, each of reinforcing elements may be formed in a specific shape of connecting multiple projections on the other side, while avoiding the positions corresponding to the projections formed on one side. This modified structure also has the effect of enhancing the rigidity of the separator, while not affecting a fluid flow on the one side. Formation of the reinforcing elements by connecting the projections along the direction of another fluid flow on the other side also prevents the effect on the fluid flow on the other side. The presence of such reinforcing elements effectively prevents deformation of the separator and avoids an increase of the contact resistance.

C9. MODIFIED EXAMPLE 9

In the first and the second embodiments, the projections 42 and 46 arranged at the intervals having the preset regularity are provided in the inflow outflow areas 33 and in the connection areas 34. This structure is, however, neither restrictive nor essential. In one modified structure, there may be no regular concavo-convex structure provided in the inflow outflow areas 33 or in the connection areas 34. Formation of reinforcing elements as convexes arranged along the respective parting linear convexes 40 enhances the rigidity of the separator at the locations in the vicinity of the parting linear convexes 40 and thereby prevents deformation of the separator at the locations in the vicinity of the parting linear convexes 40. Namely the presence of the reinforcing elements in this modified structure assures the similar effects to those of the first embodiment and the second embodiment discussed above. In this modified structure, it may be preferable to form and protrude the reinforcing elements on a specific side of the separator with the flow of a fluid having the lower flow pressure, for example, on the refrigerant flow path side of the separator in the embodiment. This arrangement has the better effect of enhancing the rigidity of the separator at the locations in the vicinity of the parting linear convexes.

The invention claimed is:

1. A gas separator for a fuel cell, the gas separator comprising:
a concavo-convex structure formed in mutually reversed shapes on two opposite sides of the gas separator to define flow paths of different fluids on the respective two sides,
the concavo-convex structure including:
multiple first projections formed and protruded on one side of the two opposite sides and arranged at intervals having regularities in both a first direction and a second direction that is different from the first direction such that the multiple first projections are located away from one another;
multiple second projections formed and protruded on the other side of the two opposite sides in a specific area corresponding to an area for formation of the multiple first projections on the one side and arranged at intervals having regularities in both the first direction and the second direction such that the multiple second projections are located away from one another, wherein the first projections and the second projections are alternately arranged along at least one of the first direction and the second direction; and
a reinforcing element protruded on the one side and formed as a convex in a specific shape of connecting multiple positions where the first projections are expected to be formed according to the regularities, while avoiding positions corresponding to the second projections formed on the other side.

2. The gas separator for the fuel cell in accordance with claim 1, wherein the reinforcing element is formed in a specific shape of connecting multiple positions along a direction of a fluid flow running through a flow path formed on the one side, where the first projections are expected to be formed.

3. The gas separator for the fuel cell in accordance with claim 1, the gas separator further having:
a parting linear convex formed and protruded on either one of the two opposite sides to be extended in a specified direction in a power generation area with the concavo-convex structure formed therein, the parting linear convex parting the power generation area into a parted region corresponding to an upstream section of a fluid flow on the side with the parting linear convex and a parted region corresponding to a downstream section of the fluid flow,
wherein the reinforcing element is arranged along the parting linear convex.

4. The gas separator for the fuel cell in accordance with claim 3, wherein the first projections and the second projections are arranged alternately at equal intervals both in a direction parallel to and in a direction perpendicular to the parting linear convex.

5. The gas separator for the fuel cell in accordance with claim 3, wherein the reinforcing element is formed in a specific shape of connecting multiple positions along the parting linear convex, where the first projections are expected to be formed.

6. The gas separator for the fuel cell in accordance with claim 3, wherein the reinforcing element includes multiple convexes formed by discretely connecting multiple positions, where the first projections are expected to be formed, and arranged along the parting linear convex.

7. The gas separator for the fuel cell in accordance with claim 3, wherein the reinforcing element is formed on each adjacent side of the-parting linear convex.

8. The gas separator for the fuel cell in accordance with claim 3, wherein the parting linear convex is formed and protruded on the other side of the two opposite sides.

9. The gas separator for the fuel cell in accordance with claim 8, wherein a flow path of one fluid is formed on the other side by connecting the parted regions, which are parted by the parting linear convex, in series via a connection area formed close to one end of the parting linear convex, and
a flow path of another fluid is formed on the one side to introduce the another fluid in one fixed direction parallel to the parting linear convex.

10. A fuel cell, comprising:
a power generation assembly including an electrolyte membrane and electrodes formed on respective sides of the electrolyte membrane; and
a pair of the gas separators for the fuel cell in accordance with claim 1 that are arranged across the power generation assembly and are combined with the power generation assembly to define flow paths of reactive gases.

11. A fuel cell, comprising:
a power generation assembly including an electrolyte membrane and electrodes formed on respective sides of the electrolyte membrane; and
a pair of the gas separators for the fuel cell in accordance with claim 3 that are arranged across the power generation assembly and are combined with the power generation assembly to define flow paths of reactive gases,
wherein a fluid flowing on one side of the gas separator with the parting linear convex protruded and formed thereon has a higher flow pressure than another fluid flowing on the other side of the gas separator.

* * * * *